US008935686B2

(12) United States Patent
Brewis et al.

(10) Patent No.: US 8,935,686 B2
(45) Date of Patent: Jan. 13, 2015

(54) ERROR-CODE AND EXCEPTION-BASED FUNCTION DISPATCH TABLES

(75) Inventors: Deon Brewis, Redmond, WA (US); James Springfield, Woodinville, WA (US); Sridhar S. Madhugiri, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 160 days.

(21) Appl. No.: 13/596,303

(22) Filed: Aug. 28, 2012

(65) Prior Publication Data

US 2014/0068573 A1  Mar. 6, 2014

(51) Int. Cl.
G06F 9/45 (2006.01)

(52) U.S. Cl.
USPC ........................................................ 717/161

(58) Field of Classification Search
USPC ......... 717/108, 140, 116, 137, 153, 159, 161; 719/315, 318; 714/38.12
See application file for complete search history.

(56) References Cited

U.S. PATENT DOCUMENTS

| 5,628,016 | A * | 5/1997 | Kukol ............................ 717/140 |
| 6,182,282 | B1 | 1/2001 | Stoodley et al. |
| 6,748,455 | B1 * | 6/2004 | Hinson et al. ................. 719/318 |
| 7,100,153 | B1 | 8/2006 | Ringseth et al. |
| 2001/0037417 | A1 * | 11/2001 | Meyer ............................ 709/332 |
| 2004/0268301 | A1 * | 12/2004 | Kaston .......................... 717/108 |
| 2008/0235675 | A1 | 9/2008 | Chen |
| 2010/0180266 | A1 | 7/2010 | Hiniker |

OTHER PUBLICATIONS

Marius Bancila, WinRT and winmd Files, Nov. 30, 2011, http://mariusbancila.ro/blog/tag/ccx/.*
Factory Method Pattern, Mar. 7, 2014 at 17:35, http://en.wikipedia.org/wiki/Factory_method_pattern.*
Sadler, et al., "Compiler Techniques for Efficiently Implementing Virtual Function Calls Using Predicated Execution in EPIC Architectures", Retrieved at << http://citeseerx.ist.psu.edu/viewdoc/download?doi=10.1.1.35.175&rep=rep1&type=pdf>>, IEEE Trans Computers, Mar. 2000, pp. 29.

(Continued)

Primary Examiner — Tuan A Vu
(74) Attorney, Agent, or Firm — Kevin Sullivan; Kate Drakos; Micky Minhas (57) ABSTRACT

A condition detected by a virtual routine may be treated by setting an error code or raising an exception, depending on circumstances. Enhanced vtable layouts promote availability of both error-ID-based and exception-based virtual routines, while maintaining compatibility. Compilers treat virtual routines based on their circumstances. One enhanced vtable includes error-ID-based routine pointers in a COM-layout-compatible portion and exception-based routine pointers in an extension. For a virtual routine not overridden by a derived class, a compiler generates a direct call. For an object instance of a specific type, the compiler generates a direct exception-based call for the object's routine. For a factory-sourced object's routine, the compiler generates a virtual exception-based call. When the virtual routine belongs to a component having an enhanced vtable, the compiler may generate a virtual call using the exception-based routine pointer. Code wrappers between COM and native format may also be used.

20 Claims, 3 Drawing Sheets (56) References Cited

OTHER PUBLICATIONS

Driesen, et al., "The Direct Cost of Virtual Function Calls in C++", Retrieved at <<http://www.cs.ucsb.edu/~urs/oocsb/papers/oopsla96.pdf>>, In the Proceedings of the 11th ACM SIGPLAN conference on Object-oriented programming, systems, languages, and applications, Oct. 10, 1996, pp. 18.

Springfield, Jim., "Inside the C++CX Design", Retrieved at <<http://blogs.msdn.com/b/vcblog/archive/2011/10/20/10228473.aspx?PageIndex=2>>, Oct. 20, 2011, pp. 20.

Hunt, et al., "Coign: Efficient Instrumentation for Inter-Component Communication Analysis", Retrieved at <<http://citeseerx.ist.psu.edu/viewdoc/download?doi=10.1.1.49.3090&rep=rep1&type=pdf>>, In Technical Report, Feb. 1997, pp. 11.

Brewis, Deon., "Under the covers with C++ for Metro style apps", Retrieved at <<http://channel9.msdn.com/Events/BUILD/BUILD2011/TOOL-690C>>, Sep. 15, 2011, pp. 3.

Andreia Gaita, "World of coding: Binding C++ APIs, the COM way", Retrieved at <<http://blog.worldofcoding.com/2009/08/binding-c-apis.html>>, Aug. 3, 2009, pp. 20.

"C++ Vtable Example", Retrieved at <<http://sourcery.mentor.com/public/cxx-abi/cxx-vtable-ex.html>>, Sep. 10, 1999, pp. 6.

Zaman Bakshi, "Get Your Computer Science Queries Answered: C++: What are vptr and vtbl in C++ ?", Retrieved at <<http://zamanbakshifirst.blogspot.com/2006/11/what-are-vptr-and-vtbl-in-c.html>>, Nov. 7, 2006, Pages.

Nish Sivakumar, "Visual C++ and WinRT/Metro—Some fundamentals", Retrieved at <<http://www.codeproject.com/Articles/262151/Visual-Cplusplus-and-WinRT-Metro-Some-fundamentals>>, Sep. 29, 2011, pp. 11.

James McNellis, "Google+—A few useful Visual C++ compiler options", Retrieved at <<https://plus.google.com/103223393191956583132/posts/S3x2xtPmCHZ#103223393191956583132/posts/S3x2xtPmCHZ>>, Jan 14, 2012, pp. 2.

"Dynamic dispatch", Retrieved at <<http://en.wikipedia.org/wiki/Dynamic_dispatch>>, Apr. 30, 2012, pp. 3.

"Application binary interface", Retrieved at <<http://en.wikipedia.org/wiki/Application_binary_interface>>, Jul. 6, 2012, pp. 3.

"Using Windows Runtime Components in Visual C++", Retrieved at <<http://msdn.microsoft.com/en-us/library/windows/apps/hh454076(v=VS.85).aspx>>, copyright date 2012, pp. 2.

"Windows Runtime C++ Template Library", Retrieved at <<http://msdn.microsoft.com/en-us/library/hh438466%28v=VS.110%29.aspx>>, copyright date 2012, pp. 2.

"#import Directive (C/C++)", Retrieved at <<http://msdn.microsoft.com/en-us/library/8etzzkb6(v=VS.100).aspx>>, portion as early as Aug. 3, 2011, pp. 6.

"Component Object Model", Retrieved at <<http://en.wikipedia.org/wiki/Component_Object_Model>>, Jul. 25, 2012, pp. 12.

"C++/CX", Retrieved at <<http://en.wikipedia.org/wiki/C%2B%2B/CX>>, Jun. 27, 2012, pp. 3.

"Windows Runtime", Retrieved at <<http://en.wikipedia.org/wiki/Windows_Runtime>>, Jul. 21, 2012, pp. 6.

"Visual c++—Self modifying virtual table entries to point to concrete implementation", Retrieved at <<http://stackoverflow.com/questions/6771865/self-modifying-virtual-table-entries-to-point-to-concrete-implementation>>, Jul. 21, 2011, pp. 4.

"C++—Virtual dispatch implementation details", Retrieved at <<http://stackoverflow.com/questions/3972548/virtual-dispatch-implementation-details>>, portion as early as Oct. 19, 2010, pp. 5.

"Marshal.GetHRForException Method (System.Runtime.InteropServices)", Retrieved at <<http://msdn.microsoft.com/en-us/library/system.runtime.interopservices.marshal.gethrforexception.aspx>>, copyright date 2012, pp. 3.

"Virtual method table", Retrieved at <<http://en.wikipedia.org/wiki/Virtual_method_table>>, Jun. 29, 2012, pp. 4.

Joel Potischman, "Exception-Based Programming : A Primer", Retrieved at <<http://blog.arc90.com/2008/04/01/exception-based-programming-a-primer/>>, Apr. 1, 2008, pp. 5.

"Hresult", Retrieved at <<http://en.wikipedia.org/wiki/HRESULT>>, Jul. 17, 2012, pp. 3.

"Virtual function", Retrieved at <<http://en.wikipedia.org/wiki/Virtual_function>>, Jul. 25, 2012, pp. 12.

* cited by examiner

Fig. 5

ERROR-CODE AND EXCEPTION-BASED FUNCTION DISPATCH TABLES

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Some computer programming environments support "virtual routines" whose behavior can be defined dynamically at runtime and/or can be overridden by another routine which has the same signature. A routine's signature defines criteria such as the parameters the routine expects, if any, and the type of value (if any) that is returned by the routine.

Programming languages use various approaches to implement virtual routines. One approach uses a vtable data structure, which is also known variously as a virtual routine table, virtual method table, virtual function table, virtual call table, dispatch table, function dispatch table, virtual table, or v-table structure. These terms for vtable are used interchangeably herein, with the understanding that vtables can vary considerably from one another in terms of layout, content, language and other standards compatibility, and functionality, for example. But in general, a vtable data structure contains pointers to the code that currently implements one or more virtual routines. A given virtual routine can then be defined dynamically and/or be overridden, e.g., by creating a new vtable with a different value for that virtual routine's pointer, and by setting a vtable pointer to this new modified vtable. The previous vtable itself is not necessarily changed at runtime, and in some implementations is stored in read-only pages of memory.

SUMMARY

An unexpected and/or undesirable condition detected by a version of a virtual routine may be treated as an error by setting an integer error code, or it may be treated as an exception by raising an exception, or both. Which treatment or treatments to use in a given situation may depend on the ready availability of different versions of the virtual routine, on the purpose of the routine, on which programming language is in use, and/or on other factors. Some embodiments described herein provide vtable data structures whose layout promotes the availability of different versions of virtual routines, maintain compatibility, and implement particular treatments of virtual routines based on specified circumstances.

Some embodiments provide an extended-vtable approach to compiling a routine of a software program, namely, an approach that provides an extended virtual table. The virtual methods (routines) of a class are pointed to from a vtable which is associated with the class. After locating a routine body in a source code of the software program, the embodiment places two routine pointers in a virtual table data structure, namely, an exception-based routine pointer and an error-ID-based routine pointer. The exception-based routine pointer points to an exception-based version of the routine body; this version contains exception-based code which will (upon execution by a processor) throw an exception in response to an exceptional condition that is specified in the exception-based code. The error-ID-based routine pointer points to an error-ID-based version of the routine body that contains error-ID-based code, which will set an error code variable to an integer value that has a definition outside the error-ID-based code in response to an erroneous condition that is specified in the error-ID-based code. One such familiar definition defines HRESULT error codes, but other error code definitions may also be used in some embodiments.

In some embodiments, the routine includes code which will upon execution receive control in an execution context that includes a stack, with at least a return address of a call to the routine pushed onto the stack. Parameter(s) may also be pushed on the stack. The return address and any parameters are referred to collectively as "call data" or "routine call data."

In some embodiments, the placing step places the error-ID-based routine pointer in a COM-layout-compatible portion of the extended virtual table data structure. This portion of the vtable is COM-layout-compatible in the sense that it contains pointers to familiar COM functions such as those in the IUnknown interface, at locations in the extended vtable that match the locations used for those familiar functions in familiar vtable data structures. Some embodiments place the exception-based routine pointer inside the virtual table data structure but outside the COM-layout-compatible portion of the virtual table data structure.

In some embodiments, the virtual table data structure includes an exception-based interface that is tailored to use in a C++ programming language environment. Some discussions herein may refer to exception-based routines as "high-level" routines and refer to error-ID-based routines as "low-level" routines. However, the context of these phrases can make a difference in their meaning, because they sometimes denote distinctions other than use of an error-ID versus use of an exception. For example, a programming language may be considered "high-level" regardless of whether it supports exceptions, simply because it provides features that are not present in "low-level" languages such as byte code and assembly language.

Some embodiments include a generated COM-to-native-wrapper code that wraps the routine body and maps an exception to an integer error-ID value. Some include a generated native-to-COM-wrapper code that wraps the routine body and maps an integer error-ID value to an exception.

To particularize the treatment of a virtual routine based on specific circumstances, some embodiments will determine that an item containing the routine body belongs to a component which is known to utilize a function dispatch table layout containing an exception-based routine pointer and a corresponding error-ID-based routine pointer. The item may be an object or an interface, for example. Then the embodiment generates a virtual call which uses the exception-based routine pointer, without generating COM-to-native-wrapper code that wraps the routine body and without generating native-to-COM-wrapper code that wraps the routine body.

Some embodiments will determine that a routine being called has not been overridden by a derived class, and will then generate a direct call to the routine using one of the routine pointers, rather than generating a virtual call to the routine. Some embodiments determine that a routine being called is part of code where the object whose routine is being called is of a specific type, and will then generate a direct call to the routine using the exception-based routine pointer, rather than generating a virtual call to the routine, and rather than generating a call which uses the error-ID-based routine pointer. Some embodiments will determine that a routine being called is part of code where the object whose routine is being called is known to be sourced from a factory, and will then generate a virtual call using the exception-based routine pointer, rather than generating a direct call to the routine, and rather than generating a call which uses the error-ID-based routine pointer.

From a developer's point of view, some embodiments for compiling a routine of a software program include identifying to a compiler a software program source code which contains a routine body, and commanding compilation of the source code by the compiler. The developer then receives compiled code produced by the compilation, with the compiled code including a virtual table data structure containing two routine pointers, namely, an exception-based routine pointer and an error-ID-based routine pointer. The virtual table data structure contains a COM-layout-compatible portion which includes the error-ID-based routine pointer. The exception-based routine pointer again points to an exception-based version of the routine body that contains exception-based code which will throw an exception, and the error-ID-based routine pointer again points to an error-ID-based version of the routine body that contains error-ID-based code which will set an error code variable.

In some embodiments, identifying source code to the compiler includes identifying C++ programming language source code which includes exception handling code that specifies how to handle an exception when execution of the routine body raises the exception. Some embodiments allow the compiler to access a C++/CX component; the routine body belongs to the C++/CX component. "C++/CX" refers to extensions to the C++ programming language.

From an architectural perspective, some embodiments include a logical processor, a memory in operable communication with the logical processor, and a virtual table data structure residing in the memory. The virtual table has at least two routine pointers, namely, an exception-based routine pointer and an error-ID-based routine pointer. If the virtual table implements more than one virtual routine, the virtual table may have additional pairs of exception-based and error-ID-based routine pointers, one pair per virtual routine. However, in some embodiments, not every virtual routine has both pointers. For example, some virtual routines may have only low-level (error-ID-based) routine pointers in the virtual table. In some embodiments, the virtual table data structure also contains routine pointers to QueryInterface, AddRef, and Release functions of a COM IUnknown interface.

Some embodiments include a COM-to-native-wrapper code residing in the memory, wrapping a copy of the routine body, and mapping an exception to an integer error-ID value, and some include a corresponding native-to-COM-wrapper code residing in the memory, wrapping another copy of the routine body, and mapping an integer error-ID value to an exception.

In some embodiments, the routine body belongs to a component which is known to utilize a function dispatch table layout containing an exception-based routine pointer and a corresponding error-ID-based routine pointer, and the memory contains code implementing a virtual call which uses the exception-based routine pointer.

In some embodiments, the routine has not been overridden by a derived class, and the memory contains code implementing a direct call which uses one of the routine pointers, and is free of any virtual call to the routine. In some, the routine is part of code in which an object whose routine is being called is of a specific type (e.g., when creating an instance of a specific type, also known in programmer terminology as "newing up" the instance object), and the memory contains code implementing a direct call which uses the exception-based routine pointer, and is free of any virtual call to the routine, and is also free of any call which uses the error-ID-based routine pointer. In some embodiments, the routine is part of code for sourcing an object from a factory (more specifically, the object whose routine is being called is known to be sourced from a factory), and the memory contains code implementing a virtual call which uses the exception-based routine pointer, and is free of any direct call to the routine, and is also free of any call which uses the error-ID-based routine pointer. In some, the exception-based routine pointer points to a user-written function and the error-ID-based routine pointer points to a compiler-synthesized function.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Component Object Model (COM) is a binary-interface standard for software components introduced by Microsoft Corporation in the 1990s. COM can be used to facilitate interprocess communication and dynamic object creation in a large range of programming languages. As used herein, "COM" also encompasses the Object Linking and Embedding (OLE), OLE Automation, ActiveX, COM+ and Distributed Component Object Model (DCOM) technologies.

Windows Runtime (WinRT™) is a cross-platform application architecture used with the Microsoft Windows® 8 operating system (marks of Microsoft Corporation). WinRT supports development in C++ and various managed languages. WinRT applications natively support both the x86 and ARM processor architectures, and can run inside a sandboxed environment for better security and stability. C++/CX (also known as Component Extensions) includes language extensions for C++ compilers to support programming for the WinRT environment. C++/CX provides a set of syntax and library abstractions that interface with the COM-based WinRT programming model.

Some embodiments described herein help support C++ extensions in WinRT and/or COM environments. Such extensions can be used, for example, through Microsoft's Visual Studio® or Visual Studio® Express integrated development environments (marks of Microsoft Corporation). As a technological matter, however, use of the advances described herein is not inherently limited to use with compilers provided by Microsoft Corporation.

Some embodiments described herein may be viewed in a broader context. For instance, concepts such as error codes, exceptions, pointers, tables, routines, and/or compilation may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving error codes, exceptions, pointers, tables, routines, and/or compilation are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

A "routine" is code which conforms with at least one of the following definitions. (a) A routine is a function, method, procedure or other code which receives control with at least one item (a return address) pushed onto a stack; parameter(s) may also be pushed on the stack when the routine is called. (b) A routine is a function, method, or procedure which has a signature in source code specifying names for its parameters, if any, and specifying the type of its return value, if any. Types for parameter(s) may also be specified in the signature of a given routine. (c) A routine is a function, method, or procedure which has a local scope in which at least one variable is defined.

A "translation unit" is the basic unit of compilation in C++, or another language of interest. It contains the contents of a single source file, plus the contents of any header files directly or indirectly included by it, minus those lines that were ignored using conditional preprocessing statements. For example, a .cpp file along with any headers that were included by it is a translation unit. The C++ compiler frontend will see all of the code in a translation unit, but won't know about code from other translation units.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a term of the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise beyond the scope of human performance alone. "Computational steps" are steps performed computationally. Neither "automatically" nor "computationally" necessarily means "immediately".

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "pointer(s)" means "one or more pointers" or equivalently "at least one pointer".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as allowing, belonging, calling, commanding, containing, creating, defining, determining, executing, generating, handling, identifying, implementing, including, locating, mapping, newing, overriding, performing, placing, pointing, raising, receiving, residing, setting, sourcing, specifying, synthesizing, tailoring, throwing, using, utilizing, wrapping, writing (or allows, allowed, belongs, belongs to, belonged, belonged to, and so on) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal on a wire, for example. Unless expressly stated otherwise in a claim, a claim does not cover a signal per se. A memory or other computer-readable medium is presumed to be a storage medium and an article of manufacture or part of a statutory system, rather than being a carrier signal or other mere signal, unless expressly stated otherwise.

Operating Environments

Figure 1:
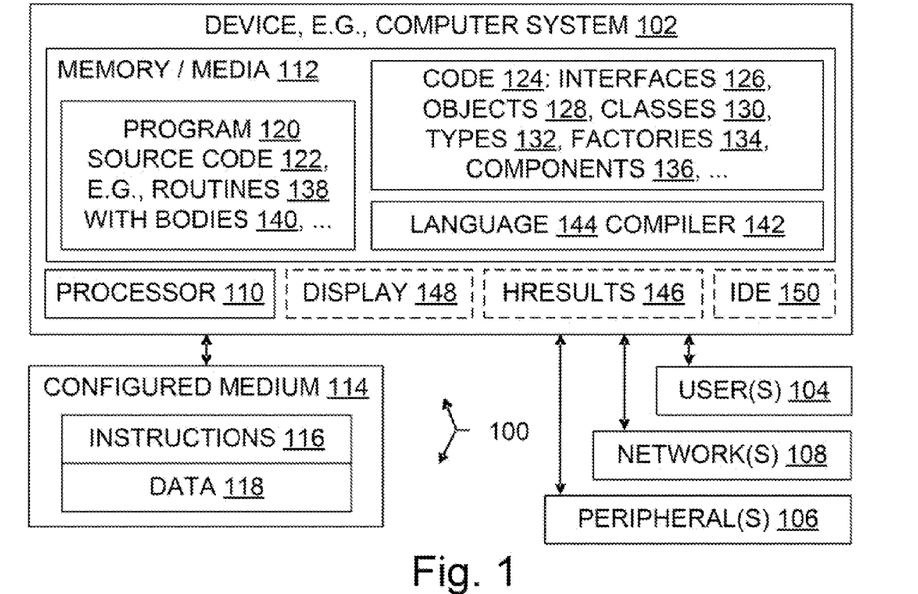
FIG. 1 is a block diagram illustrating a computer system having at least one processor, at least one memory, at least one compiler for compiling source code, and other items in an operating environment which may be present on multiple network nodes, and also illustrating configured storage medium embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, and/or of other types of media which include a tangible article of manufacture (as opposed to merely a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other memory storage devices which are not readily removable by users 104. Unless expressly stated otherwise, neither a computer-readable medium nor a computer-readable memory includes a signal per se.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, program execution, compilation, and/or other operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic. Alternatively, or in addition to software implementation, the functionally described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components.

In the illustrated environments 100, one or more software programs 120 have source code 122, or code 124 generally (source, object, executable, . . . ) such as interfaces 126, objects 128, classes 130, types 132, factories 134, COM and other components 136, and routines 138 (functions, methods, procedures) which have signatures and bodies 140. One of skill will understand that these examples of code are not mutually exclusive. For example, an object 128 may include routines 138 which have parameter and return types 132. Software development tools such as compilers 142 for one or more programming languages 144 may assist with software development by producing and/or transforming code 122, 124. Data may be present in the code, and may be defined for particular purposes, such as for example the familiar HRESULT 146 error code values which denote error conditions in some environments.

The code (data and/or instructions), tools, and other items shown in the Figures and/or discussed in the text, may each reside partially or entirely within one or more hardware media 112, thereby configuring those media. In addition to processors 110 (CPUs, ALUs, FPUs, and/or GPUs), memory/storage media 112, display(s) 148, and battery(ies), an operating environment may also include other hardware, such as buses, power supplies, wired and wireless network interface cards, and accelerators, for instance. CPUs are central processing units, ALUs are arithmetic and logic units, FPUs are floating point processing units, and GPUs are graphical processing units.

A given operating environment 100 may include an Integrated Development Environment (IDE) 150 which provides a developer with a set of coordinated software development tools such as compilers, source code editors, profilers, debuggers, and so on. In particular, some of the suitable operating environments for some embodiments include or help create a Microsoft® Visual Studio® or Visual Studio® Express development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of software development per se.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
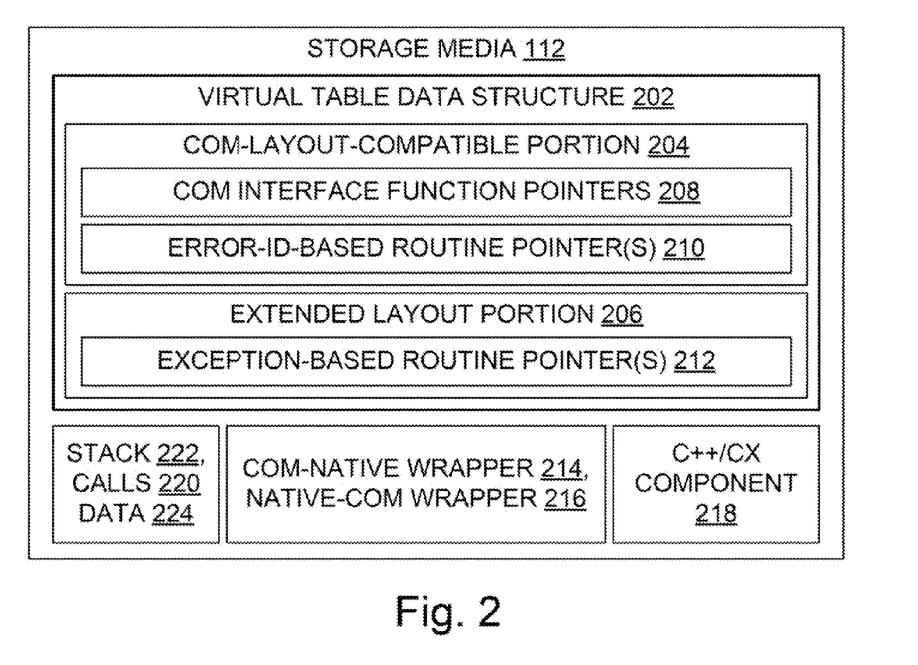
FIG. 2 is a block diagram illustrating an extended virtual table data structure in an example architecture.

FIG. 2 illustrates an architecture which is suitable for use with some embodiments. An extended virtual table data structure 202 includes both a COM-layout-compatible portion 204 and an extended layout portion 206 (also denoted the enhanced layout portion 206, the exception-support layout portion 206, or the high-level portion 206 of the vtable 202). The COM-layout-compatible portion 204 includes COM interface function pointers 208, such as pointers to IUnknown interface functions. The COM-layout-compatible portion 204 also includes one or more error-ID-based routine pointers 210, which point to low-level (error-ID-code as opposed to exception-based) routines for user-written routines 138. The extended layout portion 206 contains exception-based routine pointer(s) 212 which point to high-level (exception-based) versions of the corresponding low-level user-written routines 138.

In some embodiments, pointers 210, 212 may also or alternately point to compiler-synthesized routines, such as routines wrapped by code to convert between COM and native formats, and/or to convert between error-ID-code and exception-based responses to unusual or undesired conditions. That is, pointers 210, 212 may sometimes point to routines which include COM-to-native wrapper code 214 or native-to-COM wrapper code 216.

In some embodiments, the exception-based routine pointer(s) 212 point to routines 138 that belong to a C++/CX component. In some embodiments, a C++/CX component interface 126, C++/CX component object 128, other interface 126, or other object 128 is enhanced through use of an enhanced vtable 202, and a suitably enhanced compiler 142 implements routine calls 220 using an error-ID-based routine pointer 210 instead of an exception-based routine pointer 212, or vice versa, depending on circumstances such as the purpose and context of the call 220. In general, calls 220 pass at least a return address on a stack 222 and may also pass parameters to a called routine via the stack 222. The return address and parameters are examples of call data 224.

With reference to FIGS. 1 and 2, some embodiments provide a computer system 102 with a logical processor 110 and a memory medium 112 in operable communication with the logical processor 110 configured by circuitry, firmware, and/or software to transform source code and other code during compilation in part into an extended virtual table data structure as described herein. In some embodiments a virtual table data structure 202 residing in the memory 112 has at least two routine pointers, namely, an exception-based routine pointer 212 and an error-ID-based routine pointer 210. If the virtual table implements more than one virtual routine 138, the virtual table 202 may have additional pairs of exception-based and error-ID-based routine pointers, one pair per virtual routine.

However, in some embodiments, not every virtual routine has both pointers. For example, some virtual routines may have only low-level (error-ID-based) routine pointers 210 in the virtual table 202. In some embodiments, the virtual table data structure 202 also contains routine pointers 208 to QueryInterface, AddRef, and Release functions of a COM IUnknown interface.

Some embodiments include a COM-to-native-wrapper code 214 residing in the memory 112, wrapping a copy of the routine's body 140, and mapping an exception to an integer error-ID value, e.g., an HRESULT 146. Some include a corresponding native-to-COM-wrapper code 216 residing in the memory 112, wrapping another copy of the routine body 140 and mapping an integer error-ID value to an exception.

Depending on circumstances such as the purpose and context of a routine call, a compiler may use one kind of pointer (low-level pointer 210 vs. high-level pointer 212) instead of the other kind and/or may implement the call as direct rather than virtual or vice versa. Those of skill will understand that one difference between direct and virtual call implementation is the presence of an additional layer of indirection (follow additional pointer) in virtual calls.

For example, in some embodiments, the routine body 140 belongs to a component (C++/CX component or other component 218) which is known to utilize a function dispatch table 202 layout containing an exception-based routine pointer 212 and a corresponding error-ID-based routine pointer 210. The memory 112 contains code implementing a virtual call 220 which uses the exception-based routine pointer 212.

In some embodiments, the routine 138 has not been overridden by a derived class 130, and the memory 112 contains code implementing a direct call 220 which uses one of the routine pointers 210, 212; the memory 112 is free of any virtual call to the routine 138. That is, an enhanced compiler 142 implements the call as a direct call instead of as a virtual call.

In some embodiments, the routine 138 is part of code in which an instance of a specific type is created (e.g., by invoking a "new" feature of a language 144 to allocate memory and in many if not all cases to also initialize that newly allocated memory). The memory 112 contains code implementing a direct call 220 which uses the exception-based routine pointer 212. The memory 112 is free of any virtual call to the routine 138 in question, and is also free of any call which uses the error-ID-based routine pointer 210 to the routine. That is, an enhanced compiler 142 implements the call as a direct high-level call instead of as a virtual call, a low-level call, or both. For example, consider the following code:

```
ref class Blah : public IFoo
{
        void Foo( );
};
void routine1( )
{
        IFoo^ b = ref new Blah( );
        b->Foo( ); // The compiler can deduce that b points to a
Blah and call the high-level routine non-virtually.
}
```

Some embodiments determine that a routine being called, e.g., Foo, is part of code, e.g., routine1, where the object, whose routine is being called, is of a specific type, and will then generate a direct call to the routine using the exception-based routine pointer, rather than generating a virtual call to the routine, and rather than generating a call which uses the error-ID-based routine pointer.

In some embodiments, the routine 138 being called is part of code in which an object 128 (whose routine 138 is being called) is known to be sourced from a factory 134, and the memory contains code implementing a virtual call 220 which uses the exception-based routine pointer 212. The memory 112 is free of any direct call to the routine 138, and is also free of any call which uses the error-ID-based routine pointer 210. That is, an enhanced compiler 142 implements the call as a virtual high-level call instead of as a direct call, a low-level call, or both.

In some embodiments, an exception-based routine pointer 212 points to a user-written function and the error-ID-based routine pointer 210 points to a compiler-synthesized function, such as one including a COM-to-native wrapper 214.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, source code 122, 124 may be stored initially on multiple devices/systems 102 in a networked cloud, may then be transmitted to an enhanced compiler 142 which produces extended vtable(s) 202 on yet other devices within the cloud, and the resulting compiled code when executed may configure display(s) 148 on yet other cloud device(s)/system(s) 102.

Processes

Figure 3:
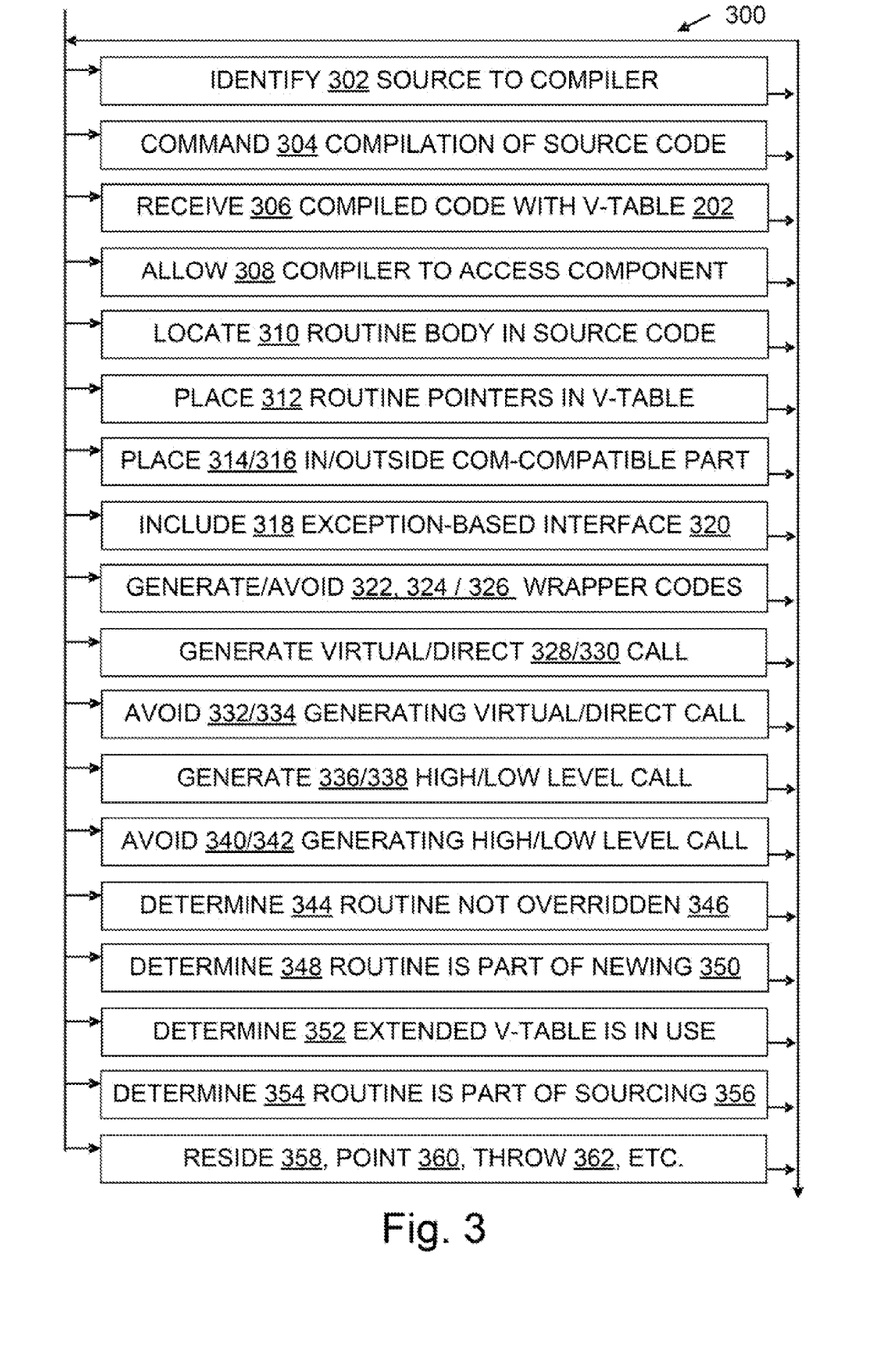
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by an enhanced compiler 142 under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

From a developer's point of view, some embodiments for compiling a routine 138 of a software program include identifying 302 to a compiler a software program source code 122 which contains a routine body 140, and commanding 304 compilation of the source code by the compiler. Familiar file or project identification mechanisms, such as dialog boxes, command line interpreters, and mechanisms used for that purpose in IDEs 150, can be used to identify 302 code to be compiled, and to command 304 the compiler to compile the identified code and to process any implicated (e.g., imported or included code) code 124. The developer 104 then receives 306 compiled code produced by the compilation.

In some embodiments, the compiled code includes a virtual table data structure 202 containing two routine pointers, namely, an exception-based routine pointer 212 and an error-ID-based routine pointer 210. In some embodiments, the virtual table data structure 202 contains a COM-layout-compatible portion 204 which includes the error-ID-based routine pointer 210. The exception-based routine pointer 212 points 360 to an exception-based version of the routine body 140 that contains exception-based code which will throw 362 an exception, and the error-ID-based routine pointer 210 points 360 to an error-ID-based version of the routine body 140 that contains error-ID-based code which will set an error code variable.

In some embodiments, identifying source code to the compiler includes identifying 302 C++ programming language 144 source code 122 which includes exception handling code that specifies how to handle an exception when execution of the routine body raises the exception. Some embodiments allow 308 the enhanced compiler 142 to access a C++/CX component 218 to which the routine body belongs. "C++/CX" refers to extensions to the C++ programming language generally, and in particular to extensions provided by Microsoft Corporation under that name. One of skill will understand that functionally equivalent extensions provided by other vendors could be substituted in a given embodiment.

From a compiler's perspective, some embodiments provide an approach to compiling a routine 138 of a software program, in which the compiler uses and/or provides an extended vtable 202. After locating 310 by usual compilation mechanisms (lexical analysis, token parsing, etc.) a routine body 140 in a source code 122 of the software program, one embodiment places 312 two routine pointers 360 for the routine in question in a virtual table data structure 202, namely, an exception-based routine pointer 212 and an error-ID-based routine pointer 210. The vtable 202 resides 358 in memory 112 (volatile and/or nonvolatile). The exception-based routine pointer points 360 to an exception-based version of the routine body; this version contains exception-based code which will (upon execution by a processor 110) throw an exception in response to an exceptional condition that is specified in the exception-based code. The error-ID-based routine pointer points 360 to an error-ID-based version of the routine body that contains error-ID-based code, which will set an error code variable to an integer value that has a definition outside the error-ID-based code in response to an erroneous condition that is specified in the error-ID-based code. One such familiar definition defines HRESULT error codes 146, but other error code definitions may also be used in some embodiments.

In some embodiments, the routine 138 includes code which will upon execution receive control in an execution context that includes a stack 222, with call data 224 such as a return address of a call to the routine pushed onto the stack. Parameter(s) may also be pushed on the stack as call data 224.

In some embodiments, the placing step 312 places 314 the error-ID-based routine pointer 210 in a COM-layout-compatible portion 204 of the extended virtual table data structure 202. This portion of the vtable is COM-layout-compatible in the sense that it contains pointers to familiar COM functions such as those in the IUnknown interface, at locations in the extended vtable that match the locations used for those familiar functions in familiar vtable data structures. Some embodiments place 312, 316 the exception-based routine pointer 212 inside the virtual table data structure but outside the COM-layout-compatible portion of the virtual table data structure 202, e.g., at a higher index or higher memory address, or in a separate array that is pointed to from within the range of addresses that include the COM-layout-compatible portion 204 (making the vtable itself a linked structure).

In some embodiments, the virtual table data structure 202 includes 318 an exception-based interface 320, 126 that is tailored for use in a C++ programming language 144 environment 100, e.g., to support C++ language features.

Some embodiments include a generated 322 COM-to-native-wrapper code 214 that wraps the routine body 140 and maps an exception to an integer error-ID value. Some include 324 a generated native-to-COM-wrapper code 216 that wraps the routine body and maps an integer error-ID value to an exception.

To particularize the treatment of a virtual routine based on specific circumstances, some embodiments will determine 352 (using familiar compilation mechanisms suitably adapted) that an item containing the routine body 140 belongs to a component 218 which is known to utilize a function dispatch table 202 layout, namely, a layout containing an exception-based routine pointer 212 and a corresponding error-ID-based routine pointer 210. The item may be an object 128 or an interface 126, for example. Then the embodiment generates 328 a virtual call 220 which uses the exception-based routine pointer 212, without generating (thus avoiding 326) COM-to-native-wrapper code that wraps the routine body and without generating (avoiding 326) native-to-COM-wrapper code that wraps the routine body.

Some embodiments will determine 344 using familiar compilation mechanisms that the routine has not been overridden 346 by a derived class 130, and then generate 330 a direct call 220 which uses one of the routine pointers 360, rather than (thus avoiding 332) generating a virtual call to the routine.

Some will determine 348 using familiar compilation mechanisms that the routine being called is part of code where an instance of a specific type 132 is created 350 and the call is a call to a virtual routine of that new instance object, and then generate 330, 336 a direct call 220 which uses the exception-based routine pointer 212, rather than (thus avoiding 332) generating a virtual call to the routine, and rather than (thus avoiding 342) generating 338 a call which uses the error-ID-based routine pointer 210.

Some embodiments will determine 354 that the routine is part of code where an object 128 is known to be sourced 356 from a factory 134, and then generate 328, 336 a virtual call 220 which uses the exception-based routine pointer 212, rather than (thus avoiding 334) generating a direct call to the routine, and rather than (thus avoiding 342) generating a call which uses the error-ID-based routine pointer.

Some embodiments recognize that a vtable has not been enhanced to contain exception-based pointers 212, and thus avoid 340 generating a high-level call 220 to a virtual routine 138. That is, the enhanced compiler 142 can maintain a backward compatibility to established familiar vtable layouts.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to propagated signal media). The storage medium which is configured may be in particular a removable storage medium 114 such as a CD, DVD, or flash memory. A general-purpose memory, which may be removable or not, and may be volatile or not, can be configured into an embodiment using items such as enhanced layout vtables 202 and enhanced compilers 142, in the form of data 118 and instructions 116, read from a removable medium 114 and/or another source such as a network connection, to form a configured medium. The configured medium 112 is capable of causing a computer system to perform process steps for transforming data through compilation with enhanced vtables as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from MoCOM documentation. "MoCOM" is an internal project name used by Microsoft Corporation in connection with WinRT and C++/CX development. Aspects of the corresponding software and/or documentation may be consistent with or otherwise illustrate aspects of the embodiments described herein. However, it will be understood that such documentation and/or implementation choices do not necessarily constrain the scope of such embodiments, and likewise that they may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

Some embodiments provide mechanisms suitable for use by Visual C++® tools (mark of Microsoft Corporation). By way of context, some environments project a high-level (exception-based) view of virtual functions to the developer 104. Behind the scenes, a C++ compiler frontend creates low-level (HRESULT-based) COM interfaces that correspond to these virtual functions and are also consumable by other languages. The low-level virtual functions dispatch into the user-provided high-level calls and catch exceptions to turn them into HRESULT values. In addition to HRESULT-exception mapping, some wrappers also translate the return value (if present) from a high-level function to an output parameter on the low-level function. Such wrapping is familiar to developers using languages such as those used in .NET environments.

In this context, some embodiments use an enhanced v-table layout to implement both high-level (exception-based) as well as low-level (HRESULT-based) versions of the same function on a single v-table 202. The first part 204 of the enhanced v-table 202 forms a standard COM interface that can be passed out to other implementations to use, while the subsequent extended part 206 of the v-table layout forms a high-level interface that only C++ can use.

In some embodiments, the single combined v-table 202 allows an enhanced compiler 142 frontend and backend to select whether a specific virtual call will be dispatched in low-level (which is safer but slower), or if it can instead be dispatched in high-level (which is faster, but only works for a suitably enhanced C++ target). One compiler 142 front-end uses logic to dispatch virtual functions to base-derived relationships of enhanced C++ types in the same translation unit via a high-level function without going through an HRESULT-based wrapper.

In some embodiments, control-flow analysis in the compiler backend also detects whether a specific interface reference was sourced from an enhanced C++ object. When this occurs, the compiler can use the combined v-table 202 to turn some low-level safe calls 220 that the front-end emits into high-level optimized calls 220. This is in addition to devirtualization. That is, some scenarios can be both high-leveled and devirtualized (e.g. creating 350 an instance of a specific type), while other scenarios are high-leveled but not devirtualized (e.g. sourcing an object from a factory).

In some embodiments, the v-table 202 is not necessarily a standard COM interface with QueryInterface and AddRef, but is instead described more generally as a table of function pointers or an array that contains function pointers 212, 210 to at least a high-level and a low-level version of a function or other routine 138. High-level and low-level versions of a function have a common function body 140, meaning they each have code that accomplishes the same computation (e.g., adding two parameters). The high-level version is exception-based, meaning it includes code to throw 362 an exception under specified conditions. The low-level code is HRESULT-based, meaning it sets an integer error code under the specified conditions, without throwing an exception.

Some embodiments specify v-table indexes in an Application Binary Interface, thereby removing compiler-dependence from a source code that directly accesses a v-table entry by specifying an index into the v-table.

Some embodiments provide a cross-language canonical form for function calls, which has the following form:
Result-code calling-convention Function-name(interface-ID, user-specified-function-parameters, optional-user-specified-function-result)

For example, the Result-code could be an HRESULT code, the calling-convention could be _stdcall or another calling convention supported by C and/or C++. The _stdcall calling convention specifies that arguments are passed right to left (i.e. last argument of call is passed first) and the called function cleans up the stack at the end of the function. Thus, one example includes the following signature for a routine Add that adds two integers: HRESULT_stdcall Add(Calculator* this, int i, int j, int* result)

In the context of exception and return value wrapping, an exception handler for the Add routine could include code such as the following:

```
try {
    int i = Add(41, 1);
}
catch (OverflowException^ e) {
    printf("Too big");
}
```

A native-to-COM wrapper 216 for Add could look like this:

```
inline int Add(int i, int j) {
    int res;
    HRESULT hr = __abi__Add(this, i, j, &res);
    if (hr != 0) {
        __throw__hr__as__exception(hr);
        // switch on hr & throw
    }
    return res;
};
```

Exception-raising code for Add could look like the following:

```
int Add(int i, int j) {
    if (i+j < i) {
        throw OverflowException( );
    }
    return i + j;
}
```

A COM-to-native wrapper 214 could include the following:

```
HRESULT __stdcall __abi__Add(Calculator* calc,
        int i, int j, int* r) {
    try {
        *r = calc->Add(i, j);
    }
```

```
    catch (Exception^ e) {
        return e->HResult;
    }
    return S_OK;
};
```

Wrappers may conform with an Application Binary Interface (ABI), such as the WinRT ABI.

As another example, consider the following:

```
// High-level
int GetValue(int index);
// Low-level
HRESULT GetValue(int index, int* value);
```

Here, the return parameter to the high-level GetValue is mapped to an out parameter in the low-level.

Some v-table 202 embodiments include a pointer to the type information at a negative offset in the v-table.

In some embodiments, all of the error-ID-based routines are put into the first part of the vtable 202 such that the vtable is compatible with the low-level definition of the interface, e.g., the first part still forms a COM-compatible vtable since the initial part of the vtable matches familiar COM vtable layouts. The exception-based routines are placed later in the vtable 202 and are only accessible from C++ code.

Figure 4:
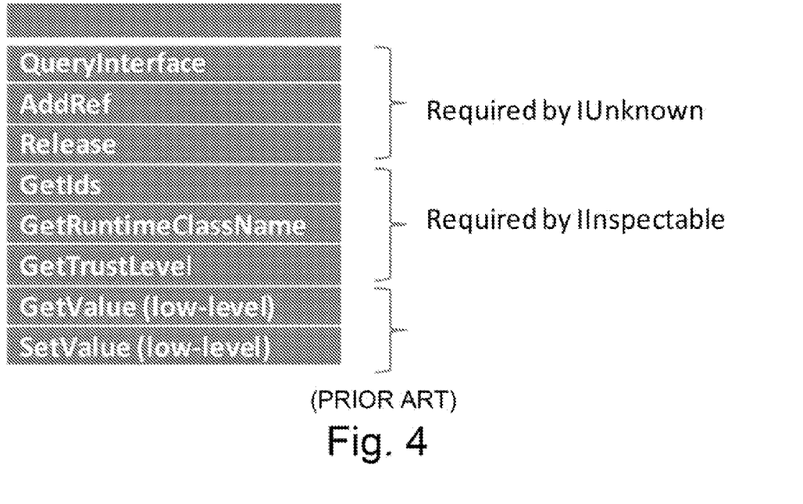
FIG. 4 is a diagram illustrating the layout of a conventional virtual table.

For example, FIG. 4 shows a familiar vtable layout for the following code:

```
interface class IFoo
{
    int GetValue(int index);
    void SetValue(int index, int value);
}
```

The FIG. 4 vtable is suitable for use in WinRT, and those of skill with recognize that similar layouts are familiar in various environments.

Figure 5:
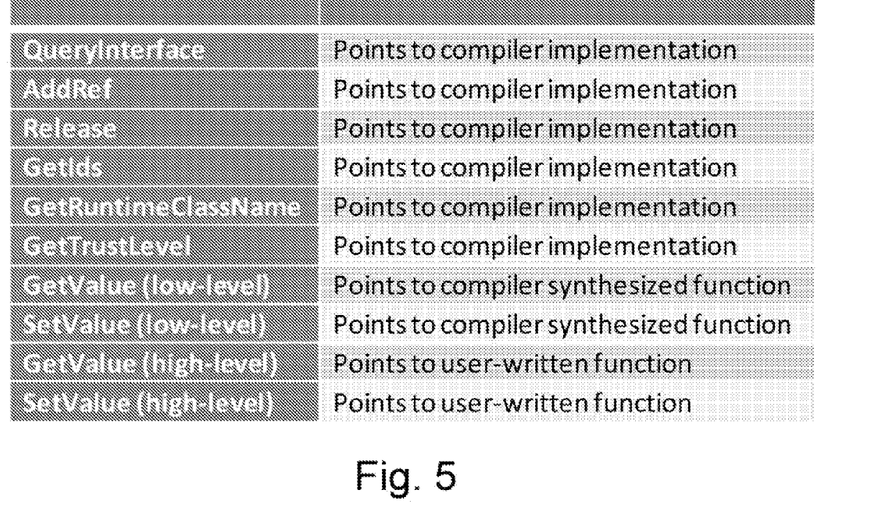
FIG. 5 is a diagram illustrating the layout of an extended virtual table in some embodiments.

By contrast, FIG. 5 illustrates a vtable generated by an enhanced C++/CX compiler 142. Note in particular the presence of both high-level and low-level routine pointers for GetValue( ) and for SetValue( ) and the positioning of the low-level pointers within a legacy-compatible portion 204 of the illustrated vtable 202.

In short, a condition detected by a virtual routine may be treated by setting an error code or raising an exception, depending on circumstances. Enhanced vtable layouts promote availability of both error-ID-based and exception-based virtual routines, while maintaining compatibility. Compilers treat virtual routines based on their circumstances. One enhanced vtable includes error-ID-based routine pointers in a COM-layout-compatible portion and exception-based routine pointers in an extension. For a virtual routine not overridden by a derived class, a compiler generates a direct call. For a virtual routine creating an instance of a specific type, the compiler generates a direct exception-based routine. For a virtual routine sourcing an object from a factory, the compiler generates a virtual exception-based routine call. When the virtual routine belongs to a component having an enhanced vtable, the compiler may generate a virtual call using the exception-based routine pointer. Code wrappers between COM and native format may also be used.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a process for compiling a routine of a software program to provide both compatibility support and speed enhancement support, the process comprising the steps of:

locating a routine in a source code of the software program, the located routine having a routine body;

providing an enhanced virtual table data structure which contains an exception-based routine pointer for a high-level dispatch and also contains an error-ID-based routine pointer for a low-level dispatch, the exception-based routine pointer pointing to an exception-based version of the routine body that contains exception-based code which will upon execution by a processor throw an exception in response to an exceptional condition that is specified in the exception-based code, and the error-ID-based routine pointer pointing to an error-ID-based version of the routine body that contains error-ID-based code which will upon execution by a processor set an error code variable to an integer value that has a definition outside the error-ID-based code in response to an erroneous condition that is specified in the error-ID-based code, the high-level dispatch using the exception based routine pointer, the low-level dispatch using the error-ID-based routine pointer, the high-level dispatch being faster than the low-level dispatch, and the low-level-dispatch being compatible with more implementations than the high-level dispatch; and implementing a call to the located routine as a high-level dispatch using the exception-based routine pointer or alternatively as the low-level dispatch using the error-ID-based routine pointer depending on at least one of the following factors:

whether the located routine has been overridden by a derived class in the software program, whether the located routine is part of code where an instance of a type is created in the software program and the call is a call to a virtual routine of the instance, whether the located routine is part of code where an object is sourced from a factory in the software program, whether the located routine is part of code in the software program which utilizes a function dispatch table layout containing corresponding pairs of exception-based routine pointers and error-ID-based routine pointers, or whether a target environment of the software program includes C++extensions.

2. The computer-readable storage medium of claim 1, wherein the error-ID-based code will upon execution set the error code variable to an HRESULT value.

3. The computer-readable storage medium of claim 1, wherein the routine includes code which will upon execution receive control in an execution context that includes a stack, with at least a return address of a call to the routine pushed onto the stack.

4. The computer-readable storage medium of claim 1, wherein the process places the error-ID-based routine pointer in a COM-layout-compatible portion of the enhanced virtual table data structure and places the exception-based routine pointer inside the enhanced virtual table data structure but outside the COM-layout-compatible portion of the enhanced virtual table data structure.

5. The computer-readable storage medium of claim 1, wherein the enhanced virtual table data structure includes an exception-based interface that is tailored to use in a C++ programming language environment.

6. The computer-readable storage medium of claim 1, wherein the process comprises the steps of:
  generating COM-to-native-wrapper code that wraps the routine body, the COM-to-native-wrapper code mapping an exception to an integer error-ID value; and
  generating native-to-COM-wrapper code that wraps the routine body, the native-to-COM-wrapper code mapping an integer error-ID value to an exception.

7. The computer-readable storage medium of claim 1, wherein the process comprises the steps of:
  determining that an item containing the routine body belongs to a component which is known to utilize a function dispatch table layout containing an exception-based routine pointer and a corresponding error-ID-based routine pointer, the item being one of: an object, an interface; and
  generating a virtual call which uses the exception-based routine pointer, without generating COM-to-native-wrapper code that wraps the routine body and without generating native-to-COM-wrapper code that wraps the routine body.

8. The computer-readable storage medium of claim 1, wherein the process comprises the steps of:
  determining that the routine has not been overridden by a derived class; and
  generating a direct call which uses one of the routine pointers, rather than generating a virtual call to the routine.

9. The computer-readable storage medium of claim 1, wherein the process comprises the steps of:
  determining that the routine being called is part of code in which an object is of a specific type, the routine belonging to the object; and
  generating a direct call which uses the exception-based routine pointer, rather than generating a virtual call to the routine, and rather than generating a call which uses the error-ID-based routine pointer.

10. The computer-readable storage medium of claim 1, wherein the process comprises the steps of:
  determining that the routine being called is part of code in which an object is dynamically created, the routine belonging to the object; and
  generating a virtual call which uses the exception-based routine pointer, rather than generating a direct call to the routine, and rather than generating a call which uses the error-ID-based routine pointer.

11. A method for compiling a routine of a software program, comprising the steps of:
  identifying to a compiler a software program source code which contains a routine having a routine body;
  commanding compilation of the source code by the compiler; and
  receiving compiled code produced by the compilation, the compiled code including a virtual table data structure containing two routine pointers, namely, an exception-based routine pointer and an error-ID-based routine pointer,
  the virtual table data structure containing a COM-layout-compatible portion which includes the error-ID-based routine pointer,
  the exception-based routine pointer pointing to an exception-based version of the routine body that contains exception-based code which will upon execution by a processor throw an exception in response to an exceptional condition that is specified in the exception-based code, and
  the error-ID-based routine pointer pointing to an error-ID-based version of the routine body that contains error-ID-based code which will upon execution by a processor set an error code variable to an integer value that has a definition outside the error-ID-based code in response to an erroneous condition that is specified in the error-ID-based code, the compiled code also characterized in that a call to the routine in the compiled code executes faster when implemented using the exception-based routine pointer than a call to the routine implemented using the error-ID-based routine pointer, the compiled code further characterized in that a call to the routine in the compiled code is implemented by using the exception-based routine pointer or alternatively by using the error-ID-based routine pointer based on at least one of the following factors:
  whether the routine has been overridden by a derived class,
  whether the routine is part of code where an instance of a type is created and the call is a call to a virtual routine of the instance,
  whether the routine is part of code where an object is sourced from a factory,
  whether the routine is part of code which utilizes a function dispatch table layout containing corresponding pairs of exception-based routine pointers and error-ID-based routine pointers, or
  whether the target environment includes C++ extensions.

12. The method of claim 11, wherein the step of identifying source code to the compiler comprises identifying C++ programming language source code which includes exception handling code that specifies how to handle an exception when execution of the routine body raises the exception.

13. The method of claim 11, further comprising allowing the compiler to access a C++/CX component, and wherein the routine body belongs to the C++/CX component.

14. A computer system comprising:
  a logical processor;
  a memory in operable communication with the logical processor;
  an enhanced virtual table data structure residing in the memory and having two routine pointers, namely, an exception-based routine pointer in an enhanced dispatch portion of the virtual table data structure, and an error-ID-based routine pointer outside the enhanced dispatch portion,
  the virtual table data structure also containing routine pointers to QueryInterface, AddRef, and Release functions of a COM IUnknown interface,
  the exception-based routine pointer pointing to an exception-based version of a routine body that contains exception-based code which will upon execution by the processor throw an exception in response to an exceptional condition that is specified in the exception-based code, and
  the error-ID-based routine pointer pointing to an error-ID-based version of the routine body that contains error-ID-based code which will upon execution by a processor set an error code variable to an integer value that has a definition outside the error-ID-based code in response to an erroneous condition that is specified in the error-ID-based code,
  the memory also containing a preconfigured extension for implementing a call to a routine which corresponds to the two versions of the routine body, wherein the extension to the call is implemented prior to a runtime dispatch by using the exception-based routine pointer, or alternatively by using the error-ID-based routine pointer, the using depending on at least one of the following factors:

whether the routine has been overridden by a derived class, whether the routine is part of code where an instance of a type is created and the call is a call to a virtual routine of the instance, whether the routine is part of code where an object is sourced from a factory, whether the routine is part of code which utilizes a function dispatch table layout containing corresponding pairs of exception-based routine pointers and error-ID-based routine pointers, whether the target environment includes C++ extensions, or whether the call will execute faster when implemented using the exception-based routine pointer instead of being implemented using the error-ID-based routine pointer.

15. The system of claim 14, wherein the system further comprises:
 a COM-to-native-wrapper code residing in the memory, wrapping a copy of the routine body, and mapping an exception to an integer error-ID value; and
 a native-to-COM-wrapper code residing in the memory, wrapping another copy of the routine body, and mapping an integer error-ID value to an exception.

16. The system of claim 14, wherein the routine body belongs to a component which is known to utilize a function dispatch table layout containing an exception-based routine pointer and a corresponding error-ID-based routine pointer, and the system further comprises code implementing a virtual call which uses the exception-based routine pointer.

17. The system of claim 14, wherein the routine has not been overridden by a derived class, and the system further comprises code implementing a direct call which uses one of the routine pointers, and the system is free of any virtual call to the routine.

18. The system of claim 14, wherein the routine is part of code where an object, to which the routine belongs, is of a specific type, and the system further comprises code implementing a direct call which uses the exception-based routine pointer, and the system is free of any virtual call to the routine, and also free of any call which uses the error-ID-based routine pointer.

19. The system of claim 14, wherein the routine is part of code where an object, to which the routine belongs, is dynamically created, and the system further comprises code implementing a virtual call which uses the exception-based routine pointer, and the system is free of any direct call to the routine, and also free of any call which uses the error-ID-based routine pointer.

20. The system of claim 14, wherein the exception-based routine pointer points to a user-written function and the error-ID-based routine pointer points to a compiler-synthesized function.

* * * * *